Jan. 22, 1963 H. P. KLING ET AL 3,074,873
NUCLEAR REACTOR FUEL ELEMENT COMPRISING A
PLURALITY OF CONCENTRIC CYLINDERS
Filed Feb. 6, 1958 3 Sheets-Sheet 2
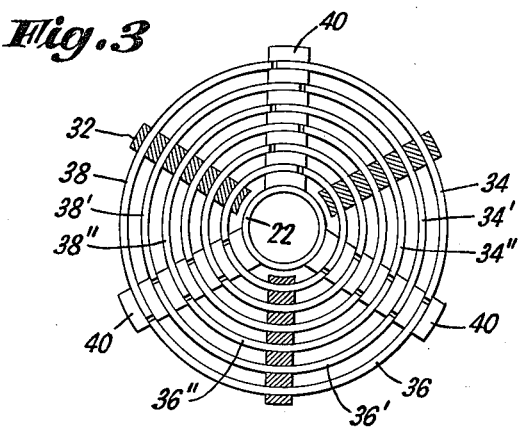
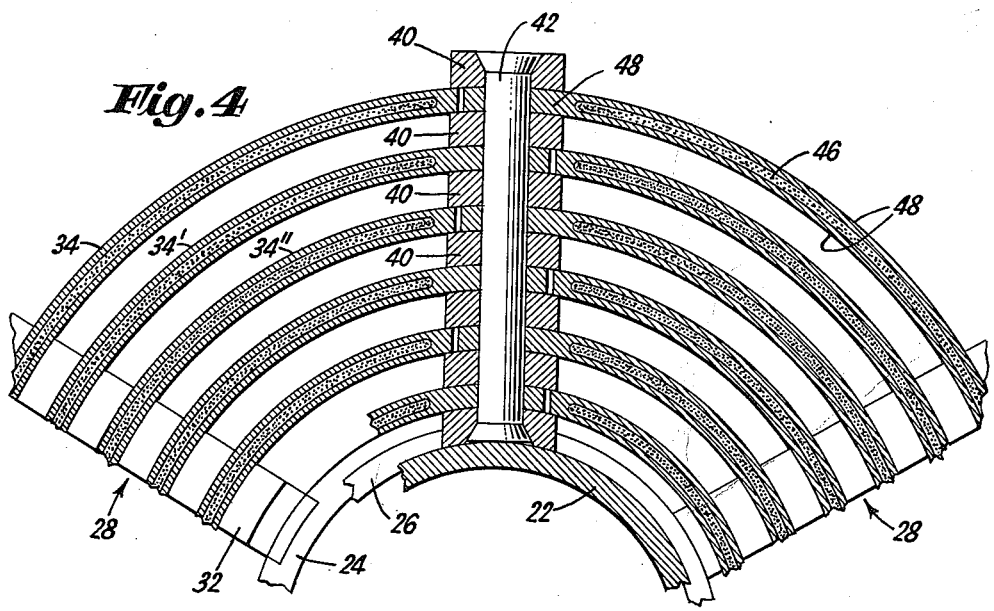
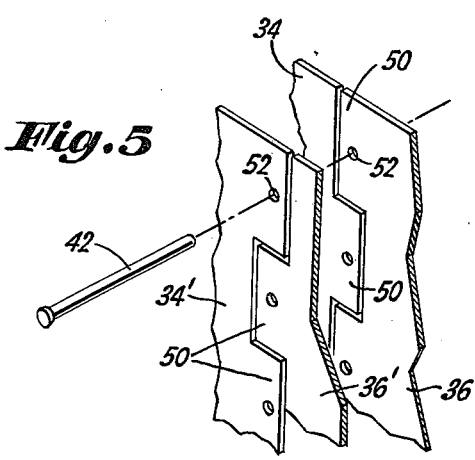
INVENTORS
HARRY KLING
EDWARD MEYER
BY
ATTORNEY Jan. 22, 1963     H. P. KLING ET AL     3,074,873
NUCLEAR REACTOR FUEL ELEMENT COMPRISING A
PLURALITY OF CONCENTRIC CYLINDERS
Filed Feb. 6, 1958     3 Sheets-Sheet 3

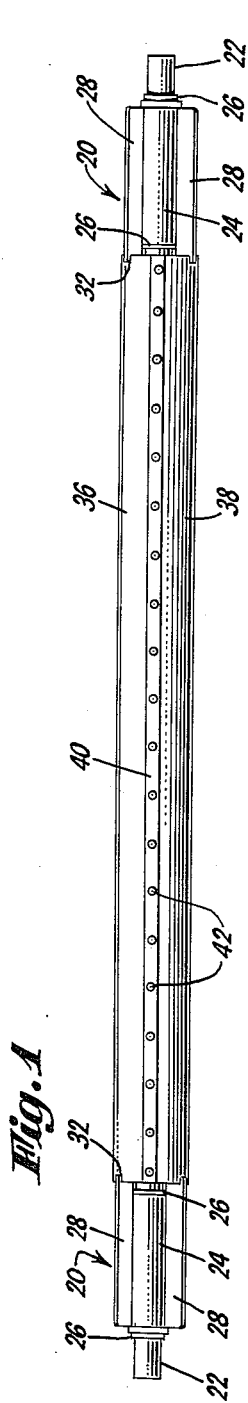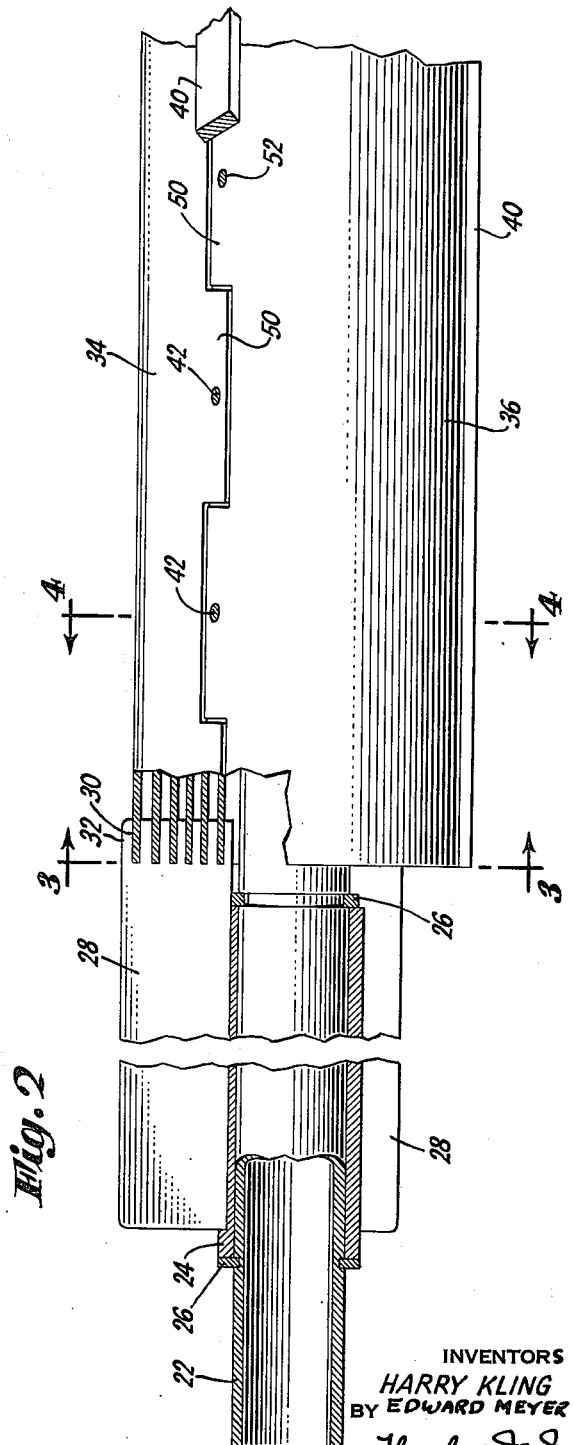

INVENTORS
HARRY KLING
BY EDWARD MEYER
ATTORNEY

United States Patent Office 3,074,873
Patented Jan. 22, 1963

3,074,873
NUCLEAR REACTOR FUEL ELEMENT COMPRISING A PLURALITY OF CONCENTRIC CYLINDERS
Harry P. Kling, Wantagh, and Edward Meyer, Cold Spring Harbor, N.Y., assignors, by mesne assignments, to Sylvania Electric Products Inc., a corporation of Delaware
Filed Feb. 6, 1958, Ser. No. 713,734
6 Claims. (Cl. 204—193.2)

Our invention is directed toward nuclear fuels for use in a nuclear reactor and more particularly relates to nuclear fuels of the solid fuel type.

One known type of solid fuel comprises a plurality of concentric, cylindrical tubes concentrically mounted about a central cylindrical shaft. Each tube is formed from a core in the form of a uranium-aluminum alloy, the core being clad with a continuous, thin aluminum outer layer. The core of each tube is not continuous over the entire cylinder, rather is formed into three separate, equidistantly spaced sections of equal area, the end of which, in cross section, defines an arc of about 110°. Each core section is separated from the adjacent section by an aluminum bar or stringer incorporated into the tube and extending along the entire length of the tube in a direction parallel to the shaft axis. Thus, each tube contains three equidistantly spaced parallel stringers.

Interposed between each two adjacent tubes are three spacer elements which extend along the entire length of the tubes in a direction parallel to the common axis, each spacer being aligned with and brazed to the corresponding stringers of both tubes. These space elements serve to maintain a fixed uniform annular spacing between the tubes. The element so constructed is cooled by continuously circulating water through these annular spacings.

A more complete description of these known solid fuel structures together with a description of the reactor in which these structures are used can be found in paper No. 57–AIF–34, entitled "A New Approach To A Materials Testing Reactor" written by Alan R. Gruber and published by the Atomic Industrial Forum, Inc.

The above described fuel, however, is extremely difficult to construct. For example, each stringer must be carefully aligned with the appropriate section and subsequently the entire assembly must be welded together. Moreover, the spacers must be brazed to the appropriate stringers. These welding and brazing operations, being carried out at high temperatures, cause the various sections to be heated unevenly and, under these circumstances, warping and dimensional distortion will ensue. Since the annular spacings between successive tubes must be formed to extremely close tolerances to prevent non-uniform cooling and resultant component failure, such warping and dimensional distortion cannot be tolerated.

We have invented a new type of fuel structure which overcomes these difficulties, and further, which can be used to form cylinders of polygonal or other irregularly spaced cross sectional areas; stated differently, our invention is not restricted to right circular cylinders as heretofore required.

Accordingly, it is an object of our invention to eliminate heat warping and dimensional distortion in a solid nuclear fuel of the character indicated.

Still another object is to provide a new and improved method for constructing solid nuclear fuels of the character indicated characterized by ease of assembly and the elimination of warping and dimensional distortion.

Yet a further object is to provide a new and improved solid nuclear fuel characterized by high structural strength, simplicity of construction, and adaptability to extremely precise manufacturing tolerances.

These and other objects of our invention will either be explained or will become apparent hereinafter.

In accordance with the principles of our invention, a plurality of hollow cylinders are nested or disposed symmetrically one within the other about a central shaft. The term "cylinder" defines any hollow solid of uniform cross section which extends in the same direction as the shaft axis and is open at both ends, the solid being generated by a straight line moving around any closed curve and remaining parallel to the shaft axis. Hence, this curve can be a smooth closed curve, as for example a circle or ellipse, or a closed curve with charp edges, as for example a rectangle or irregularly shaped polygon.

Each cylinder is formed from a plurality of cylindrical sections which are mechanically secured together at their edges to define the cylinder. Each section is fully clad, as for example with aluminum, and contains a radioactive core, as for example a uranium-aluminum alloy or a dispersion of uranium oxide particles in aluminum, which does not extend to the edges of the section, thus permitting the edges of one section to be secured to the edges of the adjacent sections without bringing the core into contact with these edges.

We have found it advantageous to form each section in such manner that each section has two opposed serrated edges; each serrated edge of any section being dovetailed with the adjacent serrated edge of the adjacent section, a spacer support formed preferably of the same metal as the clad being aligned with, joined to, and interposed between a selected dovetailed portion of any cylinder and the corresponding dovetailed portion of the adjacent cylinder.

By this technique, the structure can be easily assembled and, since welding or other subsequent high temperature treatment is not required, no warping or dimensional distortions ensue.

Illustrative embodiments of our invention will now be described in detail with reference to the accompanying drawings wherein FIG. 1 is a side view of one embodiment of our invention;

FIG. 2 is an enlarged side view of a section of FIG. 1;

FIG. 3 is a cross sectional view of the section at 3—3 of FIG. 2;

FIGS. 4 and 5 are an enlarged fragmentary cross sectional view at 4—4 and a perspective view of the embodiment of FIG. 1;

Figure 6:
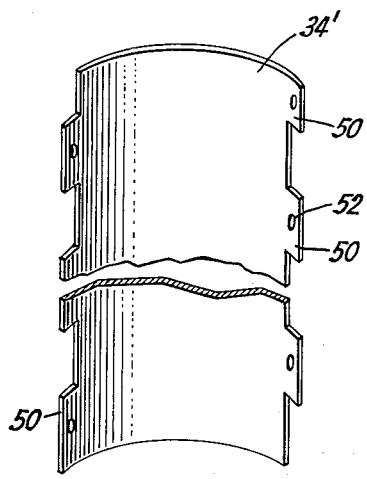
FIGS. 6 and 7 are detail views of the cylindrical sections employed in the embodiment of FIG. 1.
Figure 7:
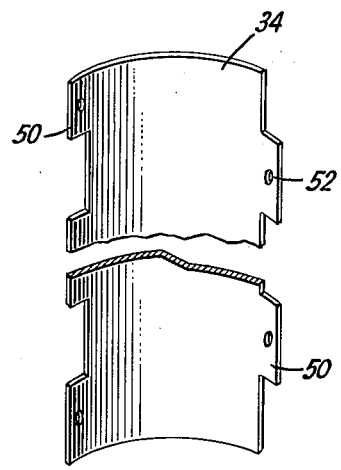

Referring now to FIGS. 1–4 and 6–7, six circular cylinders nested one within the other are concentrically disposed about a common shaft 22. Each cylinder is composed of three circular sections, for example 34, 36, 38, each defining an arc of about 120°. Each section has a continuous outer cladding or coating 48 of a suitable cladding metal, such as aluminum, and a radioactive core 46 surrounded by coating 48 and formed, for example, of a uranium-aluminum alloy or a dispersion of uranium oxide particles in aluminum.

First and second end couplers 20, secured to opposite ends of shaft 22 by sleeves 24, are each provided with fins 28 terminated in a serrated edge having fingers 32 and slots 30, the ends of all cylinders fitting respectively within the slots 30 of both end couplers 20. Sleeves 24 are each retained longitudinally in a fixed position on shaft 22 by means of a pair of rings 26, one at each end of each sleeve 24, the rings 26 being sunk circumferentially into shaft 22 as best shown in FIGURE 2, so as to lock sleeves 24 into position.

Each cylindrical section has two opposed serrated edges with teeth 50, the edges of any one section in any one cylinder dovetailing with the adjacent edges of the other sections in this cylinder. Each section in any cylinder, as for example 34, is separated from the corresponding section, as for example 34', in the adjacent cylinder by a spacer rod 40, formed preferably of the same metal as coating 48, which extends over the entire length of the sections in a direction parallel to this axis of shaft 22. Section 34" is similarly spaced from section 34', and so on toward the center of the configuration. Holes 52 are drilled through the teeth 50 of the serrated edges, and the spacer rods and cylindrical sections are mechanically secured together to form a rigid structure by pins 42 which extend through each set of aligned holes for all six cylinders.

The serrated edges of the cylindrical sections are formed solely of the cladding metal and contain no core material. Hence, in order to form each section in the required manner, a flat plate containing a core material surrounded by cladding metal is formed in known manner as taught, for example, chapter 7–5, pages 544–550 of the textbook "Metallurgy and Fuels," edited by Finneston and Howe and published in 1956 by McGraw-Hill. The plate is then serrated by appropriately slotting the edge and then rolled to the desired curvature.

As shown in FIG. 5, the mechanical strength of the resultant structure is increased by pinning a tooth 52 of any section of one cylinder, as for example section 36, to a corresponding tooth 52 of an adjacent but not corresponding section 34' of the adjacent cylinder. Also each tooth on, for example, section 34 is pinned to a similarly adjacent but not corresponding section 36' of the adjacent cylinder. Thus each section of each cylinder is pinned to each adjacent cylinder but to a not corresponding section therein, so as to afford circumferential as well as radial stress resistance. By this means the interfitted section pairs 34 and 36, 34' and 36', 34" and 36", and so forth inwardly as shown in FIGURE 3, are pinned together along the spacer rod 40 lying along the interfitting portions of these sections. So also the interfitting section pairs 36 and 38, 36' and 38' and 36" and 38", and so forth inwardly are pinned together at the next spacer rod 40 that lies along these interfitting portions. The same arrangement is provided at the remaining spacer rod 40.

Figure 8:
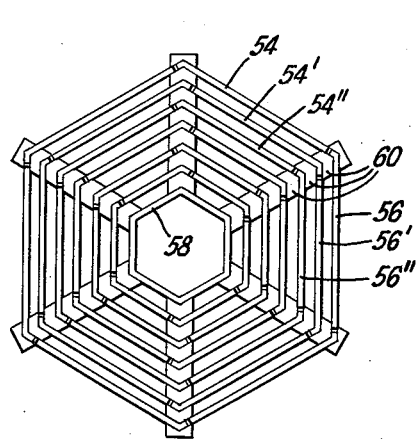
FIG. 8 is a cross sectional view of a second embodiment of our invention.
Figure 9:
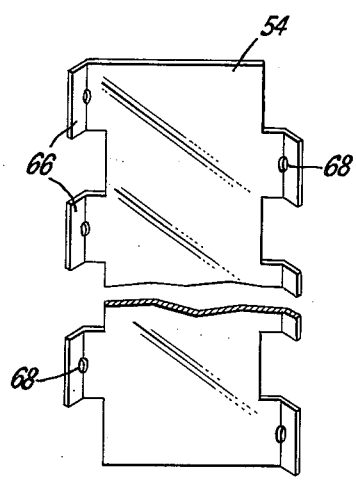
FIG. 9 is a detail view of the cylindrical sections employed in the embodiment of FIG. 8.

The structure of FIG. 1 can be modified in such manner as to utilize polygonal shaped cylinders as shown in FIGS. 8 and 9, wherein hexagonal shaped cylinders are employed. Each face of any cylinder constitutes a cylindrical section such as 54, 54' and 54", and 56, 56', 56", etc., respectively, of the three outermost polygonal cylinders shown in FIGURE 8, and each such section is formed from a flat plate in the manner previously indicated. However, the plate is not curved as in the preceding figures; rather the teeth 66 are bent in the manner indicated in FIG. 9, and holes 68 are formed through such teeth 66 in order to receive pins 42 in the manner above described. The polygonal structure is then assembled in the same manner as previously discussed.

While we have shown and pointed out our invention as applied above, it will be apparent to those skilled in the art that many modifications can be made within the scope and sphere of our invention.

What is claimed is:

1. A solid nuclear fuel element comprising a plurality of concentric circular cylinders, each of said cylinders comprising a plurality of nuclear fuel containing cylindrical sections, the opposed edges of said sections having serrated outlines describing a series of alternate tab portions and indentation portions, the tab portions and indentation portions of contiguous sections of each cylinder being fitted together so as to completely close the surface of that cylinder, each said cylinder having the same number of sections and having said sections arranged in spaced overlying relation to the corresponding sections on each other cylinder so that the serrated edges of each said overlying section are disposed in radial overlying relation to the serrated edges of each said corresponding overlying section, the said tab portions and indentation portions of the serrated edges of each said corresponding overlying section of each cylinder being arranged so that each tab on any fitted serrated section edge of any cylinder is radially bordered by an indentation on any overlying corresponding section of any other radially bordering spaced cylinder, and so that each tab on any fitted serrated section edge of any cylinder is radially bordered by a tab on the section contiguous to any overlying corresponding section of any other radially bordering spaced cylinder; a plurality of spacer members interposed between each of said cylinders and all bordering cylinders, said spacer members extending longitudinally along each of said bordering overlying serrated fitted edges, said spacers being substantially as wide as said tabs and supporting said cylinders apart in close spaced registration; and a plurality of retaining pins in registration radially through each plurality of radially overlying tabs, each of said retaining pins passing through a radial plurality of overlying tabs and through said interposed spacer members, said plurality of retaining pins being fixed therein so as to lock all said spacers and segments together radially and circumferentially.

2. The solid nuclear fuel element of claim 1 wherein said cylinders each has a circular cross-section.

3. The solid nuclear fuel element of claim 1 wherein said cylinders each has a polygonal cross-section.

4. A solid nuclear fuel element comprising a plurality of concentric circular cylinders, each of said cylinders comprising a plurality of nuclear fuel containing cylindrical sections, each section comprising a layer of nuclear fuel material and continuous metal heat transfer cladding surrounding said nuclear fuel material layer, the opposed edges of said sections having serrated outlines describing a series of alternate tab portions and indentation portions, the tab portions and indentation portions of contiguous sections of each cylinder being fitted together so as to completely close the surface of that cylinder, each said cylinder having the same number of sections and having said sections arranged in spaced overlying relation to the corresponding sections on each other cylinder so that the serrated edges of each said overlying section are disposed in radial overlying relation to the serrated edges of each said corresponding overlying section, the said tab portions and indentation portions of the serrated edges of each said corresponding overlying section of each cylinder being arranged so that each tab on any fitted serrated section edge of any cylinder is radially bordered by an indentation on any overlying corresponding section of any other radially bordering spaced cylinder, and so that each tab on any fitted serrated section edge of any cylinder is radially bordered by a tab on the section contiguous to any overlying corresponding section of any other radially bordering spaced cylinder; a plurality of spacer members interposed between each of said cylinders and all bordering cylinders, said spacer members extending longitudinally along each of said bordering overlying serrated fitted edges, said spacers being substantially as wide as said tabs and supporting said cylinders apart in close spaced registration; and a plurality of retaining pins in registration radially through each plurality of radially overlying tabs, each of said retaining pins passing through a radial plurality of overlying tabs and through said interposed spacer members, said plurality of retaining pins being fixed therein so as to lock all said spacers and segments together radially and circumferentially.

5. The solid nuclear fuel element of claim 4 wherein said continuous metal heat transfer cladding of each of said sections extends a sufficiently greater arcuate distance than said nuclear fuel material layer therein so that the serrated edges of said sections have tabs comprising solid metal heat transfer cladding material.

6. The solid nuclear fuel element of claim 4 wherein said continuous metal heat transfer cladding of each of said sections extends a sufficiently greater arcuate distance than said nuclear fuel material layer therein so that the serrated edges of said sections have tabs comprising solid metal heat transfer cladding material; and further wherein is combined a support rod, said support rod being smaller than the innermost of said cylinders so as to be disposed therein in spaced relation, said innermost cylinder and said support rod having spacer portions interposed therebetween in close registration along each of said fitted serrated edges of said innermost cylinder, and said retaining pins being disposed through said spacers and fixedly attached to said support rod.

References Cited in the file of this patent

UNITED STATES PATENTS

| | | |
|---|---|---|
| 578,801 | Wilmot | Mar. 16, 1897 |
| 1,213,684 | Osterholm | Jan. 23, 1919 |
| 2,805,473 | Handwerk | Sept. 10, 1957 |
| 2,914,454 | Gurinsky et al. | Nov. 24, 1959 |

FOREIGN PATENTS

| | | |
|---|---|---|
| 56,382 | France | July 16, 1952 |

(First addition to No. 999,330)

OTHER REFERENCES

International Conference on Peaceful Uses of Atomic Energy, 1955, vol. 9, pp. 196–207.

Nucleonics, September 1956, pp. 139–142.

Westinghouse Engineer, September 1956, pp. 138–142.

Nucleonics, November 1956, pp. 138–144.

A New Approach to Materials Testing Reactor; Paper No. 57–AIF–34, written by A. R. Gruber, published by Atomic Industrial Forum, Inc.

HW–52,457, Sept. 18, 1957, OTS, Dept. of Comm. Washington 25, D. C., page 23.